United States Patent [19]

Taga et al.

[11] Patent Number: 5,559,910
[45] Date of Patent: Sep. 24, 1996

[54] WAVELENGTH DIVISION MULTIPLEXED OPTICAL FIBER TRANSMISSION EQUIPMENT

[75] Inventors: Hidenori Taga, Saitama-ken; Noboru Edagawa, Tokyo; Shu Yamamoto; Noriyuki Takeda, both of Saitama-ken; Shigeyuki Akiba, Tokyo, all of Japan

[73] Assignee: Kokusai Denshin Denwa Kabushiki Kaisha, Japan

[21] Appl. No.: 452,028

[22] Filed: May 26, 1995

[30]     Foreign Application Priority Data

Jun. 6, 1994  [JP]  Japan ........................ 145812

[51] Int. Cl.$^6$ ..................................... G02B 6/28
[52] U.S. Cl. ............................. 385/24; 359/179
[58] Field of Search ...................... 385/24, 15, 16, 385/23, 122, 123; 359/179, 173, 176, 124

[56]             References Cited

U.S. PATENT DOCUMENTS

| | | | |
|---|---|---|---|
| 5,392,147 | 2/1995 | Kaede et al. | 359/181 |
| 5,392,377 | 2/1995 | Auracher | 385/24 |
| 5,414,548 | 5/1995 | Tachikawa et al. | 359/130 |

OTHER PUBLICATIONS

"Experimental Verification of Efficiency of Wave Generation Through Four–Wave Mixing in Low–Loss Dispersion–Shifted Single–Mode Optical Fibre", Electronics Letters, 24th Nov. 1988, vol. 24 No. 24, pp. 1528–1529.

"Design of Optical–Amplifier Repeated WDM Systems", The Spring National Conference of the Institute of Electronic Information and Communication Engineers, 1994 SB–8–6.

"Frequency Chirping in External Modulators", Journal of Lightwave Technology, Jan. 1988, vol. 6, no. 1, pp. 87–93.

*Primary Examiner*—John Ngo
*Attorney, Agent, or Firm*—Westman, Champlin & Kelly, P. A.

[57]            ABSTRACT

It is the object of the present invention to optimize the degradation due to the four-wave mixing of wavelength multiplexed signals and the distortion due to the chromatic dispersion, thereby to provide a wavelength division multiplexed optical fiber transmission equipment having good transmission characteristics. A WDM transmitting terminal consists of four transmitters of channels 1 to 4, and a wavelength-division multiplexer. Further, a WDM receiving terminal consists of an equalization optical fiber, a wavelength-division demultiplexer, and four receivers of the channels 1 to 4. The WDM transmitting terminal and the WDM receiving terminal are interconnected by transmission optical fibers and an optical amplifier. The equipment is designed so that the wavelengths $\lambda_1$, $\lambda_2$, $\lambda_3$ and $\lambda_4$ of the optical signals output from the transmitters all lie on the short-wavelength side with respect to the average zero-dispersion wavelength $\lambda_0$. This allows the distortion due to the four-wave mixing of a wavelength multiplexed signal to be reduced. The equalization optical fiber has a chromatic dispersion of a sign opposite to the chromatic dispersion of the optical fibers forming a transmitting path, thereby for compensating the chromatic dispersion of the optical signals output from the transmitters.

8 Claims, 8 Drawing Sheets

WAVELENGTH DIVISION MULTIPLEXED OPTICAL FIBER TRANSMISSION EQUIPMENT

BACKGROUND OF THE INVENTION

1. Field of the Invention

The present invention is related to an optical fiber transmission equipment, and particularly to an optical fiber transmission equipment using an optical wavelength division multiplexed signal, which can increase the transmission capacity.

2. Description of the Prior Art

Since the optical fiber transmission equipment using an optical wavelength multiplexed signal can increase its transmission capacity without changing the transmission path, it is a technique which is expected to be applied to the future optical fiber transmission equipment. If an optical wavelength multiplexed signal is utilized for an optical fiber transmission system which uses an optical amplifier as an optical repeater, in addition to the degradation factors in the optically amplified fiber transmission system (e.g. the optical waveform distortion due to the optical fiber chromatic dispersion, the optical signal-to-noise ratio degradation due to the accumulation of the amplifier noise, the distortion due to the nonlinearity of the optical fiber), there are other degradation factors such as the distortion due to the crosstalk between optical signals of different wavelengths, the distortion due to the four-wave mixing between the signal, and soon. Thus, the maximum transmission distance and the maximum channels of the WDM signal, which are the characteristics of the optical fiber transmission system, are limited. The distortion due to the four-wave mixing between the signal means the phenomenon in which, if the frequencies of two signal lights to be multiplexed are f1 and f2 (f1<f2) for instance, lights having frequencies of f1−(f2−f1) and f2+(f2−f1) are generated by mixing the two frequencies, and a distortion is caused by the interference between the light generated by the mixing and the signal light.

Specifically, in the wavelength division multiplexed optical fiber transmission system for a long distance of about 1,000 km or longer, which uses an optical amplifier as a repeater, the effect of the four-wave mixing is dominant constraint factor of the system. As the reason for that, the following two points can be given. (1) The generation efficiency of four-wave mixing is proportional to the light intensity of each signal pertinent to the generation of the four-wave mixing, and inversely proportional to the absolute value of the optical fiber chromatic dispersion which is the transmission medium for the light signal (reference: N. Shibata et al., Electronics Letters, vol. 24, pp. 1528–1529, 1988). (2) In a transmission path in which a multiplicity of optical amplifiers are relayed, the four-wave mixing produced in the respective repeater sections are added together, accumulated and increase.

As a future optical fiber transmission system, a system is proposed in which, to minimize the waveform distortion due to the optical fiber chromatic dispersion thereby to increase the transmission bit-rate of a light signal, the absolute value of the fiber chromatic dispersion of the optical fiber for transmission becomes substantially zero in the wavelength band of the optical signal to be used. In this optical fiber transmission system, the distortion due to the four-wave mixing which is caused by the transmission of an optical wavelength multiplexed signal would be more dominant than other distortion factors for the above reason.

To suppress the distortion due to the four-wave mixing, it is necessary to separate the signal wavelength of the wavelength multiplexed signal light and the zero-dispersion wavelength of the transmission path from each other. As an example of this, a method for designing a wavelength multiplexing system was proposed (reference: Ishikawa et al., the Spring National Conference of the Institute of Electronic Information and Communication Engineers of 1994 SB-8-6). In this method, the signal waveform distortion due to the chromatic dispersion produced by the separation of the signal wavelength of the wavelength division multiplexed signal light and the zero-dispersion wavelength of the transmission path is compensated by a dispersion compensator. This signal waveform distortion can be reduced by such compensation.

However, in this conventional method, the signal wavelength of each signal light is determined in a particular system length from the gain bandwidth of the optical amplifier, or the like, and there was a problem that system length change could not be served.

SUMMARY OF THE INVENTION

It is the object of the present invention to remove the above described problem of the prior art and possible guidelines for designing a wavelength division multiplexed optical fiber transmission equipment which is effective regardless to the system length, and particularly to optimize the distortion due to the four-wave mixing of a wavelength multiplexed signal and the distortion due to the chromatic dispersion, thereby to provide a wavelength division multiplexed optical fiber transmission equipment having good transmission performances.

To accomplish the above object, the present invention is characterized by comprising: an optical fiber provided between a transmitter for transmitting a wavelength multiplexed optical signal and a receiver for receiving the wavelength multiplexed optical signal sent from the transmitter and for connecting the transmitter and the receiver, an optical repeater inserted into the optical fiber for performing an optical amplification, and a dispersion medium for equalizing the fiber chromatic dispersion distortion caused by the difference between the wavelength of each optical signal of the wavelength multiplexed signal sent from the transmitter and the average zero-dispersion wavelength with wavelength dispersion of the opposite sign, and putting all the respective optical signal wavelengths of the wavelength multiplexed signal on the short-wavelength side or the long-wavelength side with respect to the average zero-dispersion wavelength of the whole optical transmission path consisting of the optical fiber, the repeater and the dispersion medium.

In accordance with the present invention, since the optical signal wavelengths of the WDM signal all exist on the short-wavelength side or the long-wavelength side with respect to the average zero-dispersion wavelength of the whole transmission path, it is possible that phase matching, the requirement for the generation of a four-wave mixing, is not satisfied, and thus there is an effect of reducing the generation of a four-wave mixing. In addition, since the waveform distortions of the respective signal wavelengths for a long-distance transmission have a similar trend for all signal wavelengths, the wavelength distortion due to the interaction between the wavelength dispersion of the optical fiber for transmission and the nonlinearity is reduced by the dispersion equalization, and thus the optical signal transmission characteristics can easily by improved.

DETAILED DESCRIPTION OF THE PREFERRED EMBODIMENT

Figure 1:
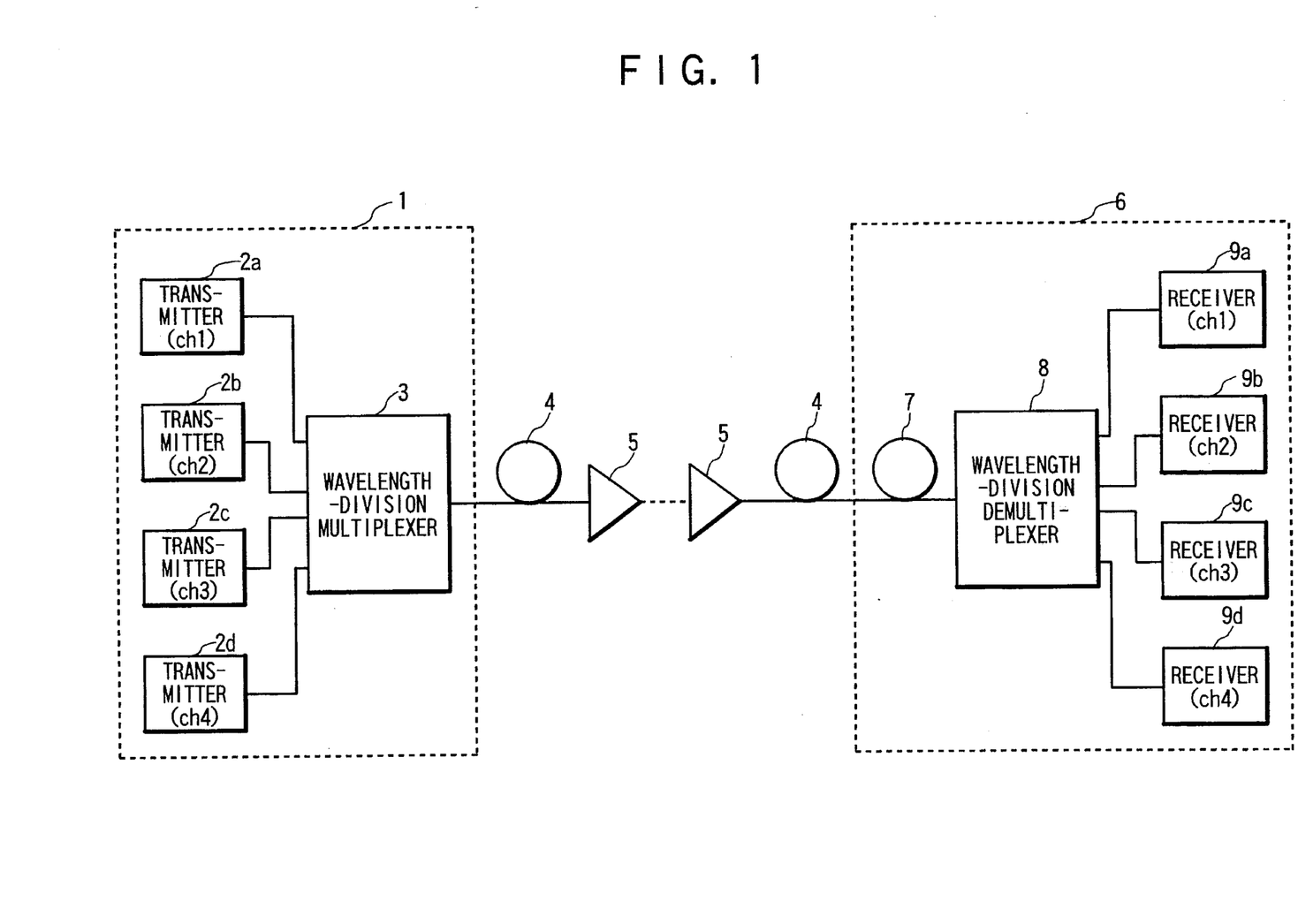
FIG. 1 is a block diagram showing the construction of the wavelength division multiplexed optical fiber transmission equipment of an embodiment of the present invention.

Now, the present invention is described in detail with reference to the drawing. FIG. 1 is a block diagram showing an example of the wavelength division multiplexed optical fiber transmission equipment for explaining an embodiment of the present invention.

In the figure, a WDM transmitting terminal 1 consists of a transmission equipment, which comprises four transmitters 2a to 2d of channels 1 to 4, and a wavelength-division multiplexer 3. Further, a WDM receiving terminal 6 consists of a receiving equipment, which comprises an equalization optical fiber 7, a wavelength-division demultiplexer 8, and four receivers 9a to 9d of channels 1 to 4. The WDM transmitting terminal 1 and the WDM receiving terminal 6 are interconnected by transmission optical fibers 4 and optical amplifiers 5. The optical amplifiers 5 function to relay and amplify the signal light transmitted through the transmission optical fibers 4.

The equalization optical fiber 7 has a chromatic dispersion of a sign opposite to the chromatic dispersion of the above optical fiber so as to equalize the chromatic dispersion which is caused by the difference between the wavelengths of the respective optical signals output from the transmitters 2a to 2d of the channels 1 to 4 and the total averaged zero-dispersion wavelength of the optical fiber and the repeater. Further, the equalization optical fiber 7 has a length which is sufficiently short as compared with the total transmission distance. In addition, although, in this embodiment, the equalization optical fiber 7 is placed in the WDM receiving terminal 6, the present invention is not limited to this, and it may be placed in the transmitting terminal or optical fiber relay station, or at least in two places of the transmitting terminal, receiving terminal and optical fiber relay station.

Figure 2:
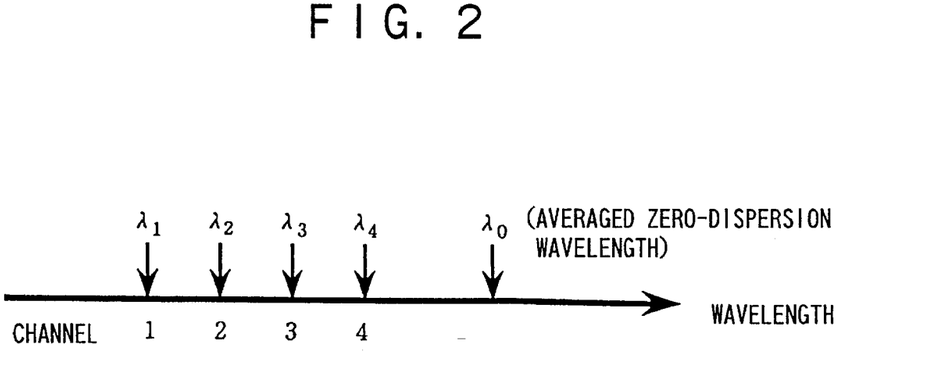
FIG. 2 is a diagram showing the relationship between the signal wavelengths of the respective optical signal channels and the zero-dispersion wavelength.

If the four transmitters 2a to 2d of the channels 1 to 4 output signal lights having optical signal wavelengths $\lambda_1$, $\lambda_2$, $\lambda_3$ and $\lambda_4$, in this embodiment, as shown in FIG. 2, it is designed so that the optical signal wavelengths $\lambda_1$ to $\lambda_4$ are all put on the short-wavelength side with respect to the average zero-dispersion wavelength $\lambda_0$ for the whole transmission path. However, the present invention is not limited to this, and it may of course be designed so that all of the optical signal wavelengths $\lambda_1$ to $\lambda_4$ of the wavelength multiplexed signal are placed on the long-wavelength side with respect to the average zero-dispersion wavelength $\lambda_0$ of the whole transmission path. Here, the abscissa in FIG. 2 indicates the optical signal wavelength of the wavelength multiplexed signal.

In this embodiment, since the all optical signal wavelengths $\lambda_1$ to $\lambda_4$ of the wavelength multiplexed signal are put on the short-wavelength side or the long-wavelength side with respect to the average zero-dispersion wavelength $\lambda_0$ of the whole transmission path, as shown, there is an effect that the phase matching is not satisfied, and there is also an effect that the occurrence of four-wave mixing can be reduced.

The reason for that is as follows. The occurrence efficiency of a four-wave mixing is affected by the phase matching of the signal lights related to the four-wave mixing. The phase matching condition is not satisfied if the absolute values of the chromatic dispersions of two signal lights are different, but, the group delays are equal if the absolute values are equal, and thus the phase matching condition is satisfied to increase the generation efficiency of the four-wave mixing. Accordingly, if the optical signal wavelengths of the wavelength multiplexed signal are placed on both sides of the average zero-dispersion wavelength of the whole transmission path, the four-wave mixing easily occurs and the transmission characteristics greatly degrade.

Furthermore, since the present invention is designed so that the optical signal wavelengths $\lambda_1$ to $\lambda_4$ are all put on the long-wavelength side with respect to the average zero-dispersion wavelength $\lambda_0$, the waveform distortions of the respective signal wavelengths due to the long-distance transmission all have a similar trend. As a result, the waveform distortion due to the interaction between the chromatic dispersions and the nonlinearity of the transmission optical fibers 4 are reduced, whereby the optical signal transmission characteristics can easily be improved.

The reason for that is as follows. The waveform distortion due to the interaction of the chromatic dispersions and the nonlinearity of the transmission optical fibers 4 is different between the short-wavelength side and the long-wavelength side with respect to the zero-dispersion wavelength of the optical fiber. The pulse tends to spread on the short-wavelength side, while the pulse is compressed by the soliton effect on the long-wavelength side. Thus, if the optical signal wavelengths of the wavelength multiplexed signal are all placed on the short-wavelength side or long-wavelength side with respect to the average zero-dispersion wavelength $\lambda_0$ of the whole transmission path, the waveform distortions of the respective signal wavelengths all have s similar trend.

In this case, if it is further considered that the equalization optical fiber 7 is placed in the transmitting terminal, receiving terminal, or on the course of the repeating, or at least in two of them to equalize the accumulated chromatic dispersion, the trends of the change of the optical waveform due to the chromatic dispersion equalization all become similar in the respective signal wavelengths. As a result, the waveform distortions due to the interaction between the chromatic dispersions and the nonlinearity of the optical fibers are reduced by the equalization of the accumulated chromatic dispersion, and the transmission characteristics of the wavelength multiplexed signal is improved. However, if the optical signal wavelengths of the wavelength multiplexed signal are placed on both sides of the zero-dispersion wavelength of the transmission path, the trends of the change of the optical waveforms are different, and thus the equalization performed by the equalization optical fiber placed in the transmitting terminal, receiving terminal, or course of the repeating, or at least in two of them is different between both sides. Accordingly, although the transmission characteristics are improved on one side, the short-wavelength or long-wavelength side, they even degrade on the opposite side.

Moreover, this embodiment is characterized in that not only the optical signal wavelengths of the wavelength multiplexed signal are all placed on the short-wavelength side or the long-wavelength side with respect to the zero-dispersion wavelength of the transmission path, but also the accumulated chromatic dispersion caused by the difference between the signal wavelengths and the zero-dispersion wavelength is equalized by the equalization optical fiber 7 having a dispersion of the opposite sign. In this case, the present inventor experimentally found out that the distortion becomes very small if the absolute value $D_{eq1}$ (ps/nm) of the dispersion value to be equalized follows the expression (1) at the all equalization points, and the residual chromatic dispersion $D_{rem}$ (ps/nm) after the equalization satisfies the expression (2) at the all signal wavelengths.

$$0 < D_{eq1} \leq 50000/B^2 \qquad (1)$$

$$-30000/B^2 \leq D_{rem} \leq +30000/B^2 \qquad (2)$$

In the above expressions, B represents the bit rate (Gbps) of the optical transmission path.

Figure 3:
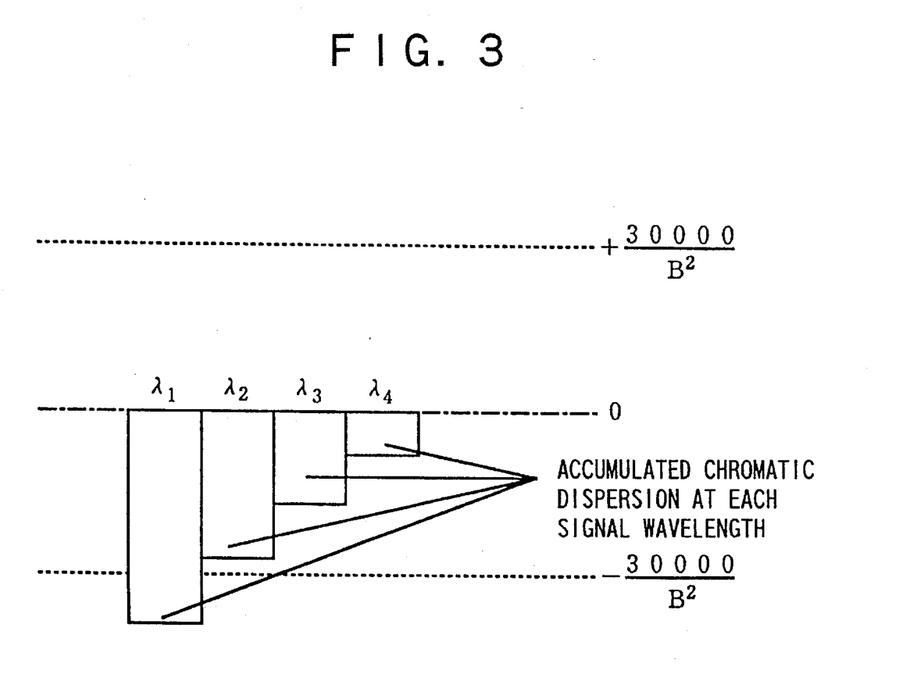
FIG. 3 is a diagram showing the accumulated wavelength dispersion amount at each channel before the equalization optical fiber is inserted.

To be assumed that, in the wavelength division multiplexed optical fiber transmission equipment of FIG. 1, the wavelength multiplexed signal of channels 1 to 4 are sent from the WDM transmitting terminal 1 to the WDM receiving terminal 6, the accumulated chromatic dispersions of the respective signal wavelengths $\lambda_1$ to $\lambda_4$ at the input of the WDM receiving terminal 6 are as shown in FIG. 3. That is, the accumulated chromatic dispersions before the equalization take negative values, and their absolute values are maximum in the channel 1 which is the most distant from the zero-dispersion wavelength, and minimum in the channel 4.

Figure 4A:
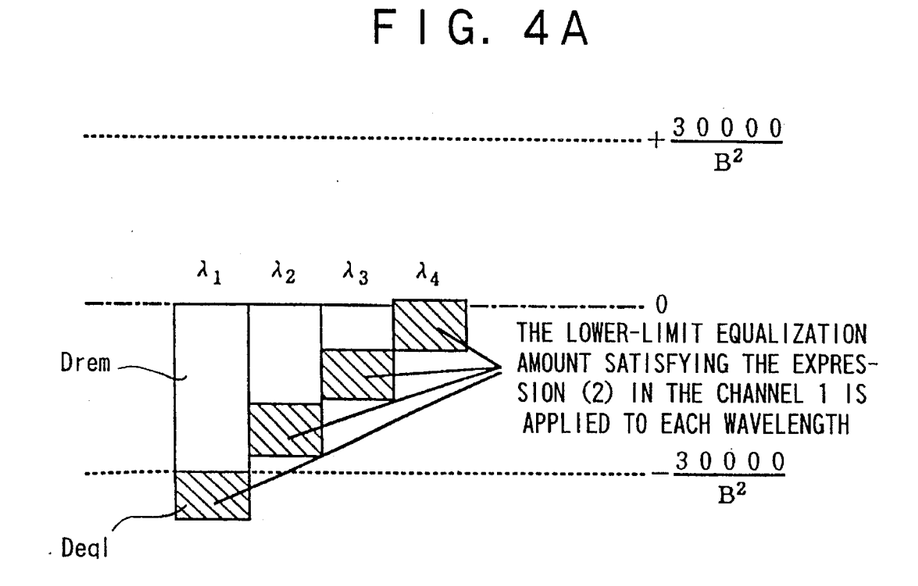
FIGS. 4A and 4B are diagrams showing the accumulated wavelength dispersion after each channel equalization when the equalization optical fiber with the minimum wavelength dispersion is inserted, and the accumulated wavelength dispersion after each channel equalization when the equalization optical fiber with the maximum wavelength dispersion is inserted, respectively.
Figure 4B:
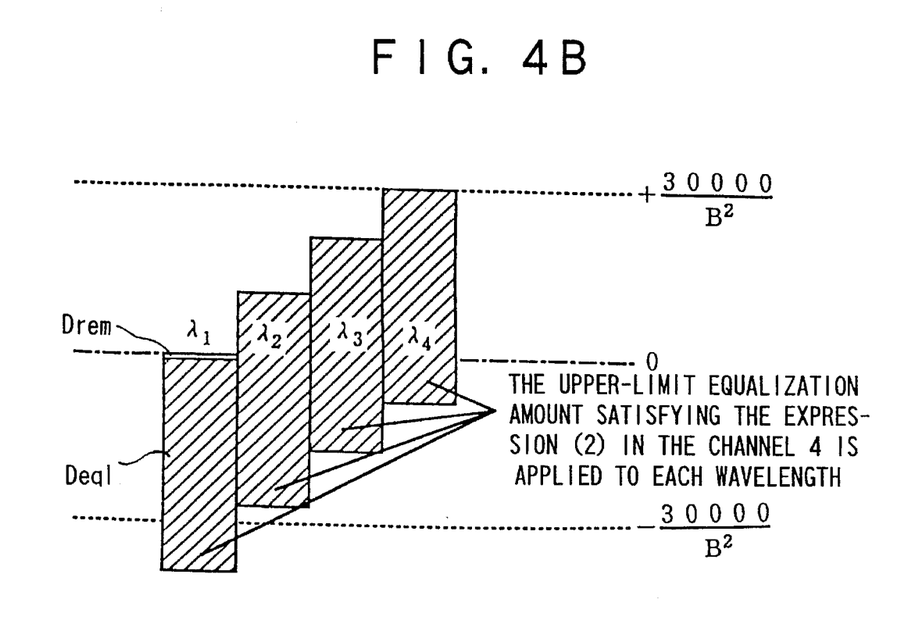

Then, after the equalization by the equalization optical fiber 7, the expression (2) must be satisfied at the all signal wavelengths, and thus, as shown in FIG. 4A, the minimum equalization amount is obtained when the residual chromatic dispersion in the channel 1 is $-30000/B^2$ or greater. In other words, if the equalization is performed by the hatched chromatic dispersions of FIG. 4A, the residual chromatic dispersions $D_{rem}$ (ps/nm) (the white portions in FIG. 4A) after the equalization satisfy the expression (2) at all signal wavelengths. Similarly, the maximum equalization amount is obtained when the residual chromatic dispersion in the channel 4 is $+30000/B^2$ or lower, as shown in FIG. 4B.

Further, the absolute values $D_{eq1}$ (ps/nm) of the chromatic dispersions of the dispersion medium used for the equalization (in FIGS. 4A and 4B, the hatched portions) must satisfy the expression (1).

Although the restrictions of the expressions (1) and (2) are based on the experimental values obtained by various experiments, it is known that the restriction of the optical signal transmittable distance L caused from the waveform distortion due to the fiber chromatic dispersion is given by the following expression (3) (reference: F. Koyama et al., IEEE J. of Lightwave Technol., vol. LT-6, pp. 87–93).

$$B^2 L = \pi C/2\lambda^2 D(2(\alpha^2+1)^{1/2}+2) \qquad (3)$$

In the expression (3), c represents the speed of light in vacuum, $\lambda$ represents the wavelength of the signal light source, and $\alpha$ represents the line width broadening factor of the optical transmitter. The restriction of the tolerable chromatic dispersion amount D×L is obtained as a function of the bit rate B from the expression (3), and since its value is substantially equal to the restrictions of the expressions (1) and (2), so that the expressions (1) and (2) are also theoretically valid values.

The reason for that is as follows. By squaring both sides of the expression (3) and replacing $B^2$ and D with each other, the following expression is obtained.

$$DL \times 10^{-8} = \frac{1}{B^2 \times (10^9)^2} \cdot \frac{\pi c}{2\lambda^2 (2\sqrt{\alpha^2+1} + 2\alpha)}$$

In this expression, DL is a numeric value which has the same dimension as $D_{eq1}$ and $D_{rem}$ of the expressions (1) and (2).

Then, if 1.55 μm is used as the wavelength $\lambda$ and 0.5 is used as the parameter $\alpha$, $$\frac{\pi c}{2\lambda^2 (2\sqrt{\alpha^2+1} + 2\alpha)} \approx 6 \times 10^{19}$$

is obtained. If, in the expressions (1) and (2) it is taken into consideration that the unit of L is km ($10^3$) and the unit of B is Gbps ($10^9$), the following expression is obtained.

$$DL = \frac{1}{B^2} \cdot \frac{\pi c}{2\lambda^2 (2\sqrt{\alpha^2+1} + 2\alpha)}$$

From this, $$DL = \frac{1}{B^2} \times 60000$$

is obtained, and thus the expressions (1) and (2) nearly satisfy this restriction.

Figure 5:
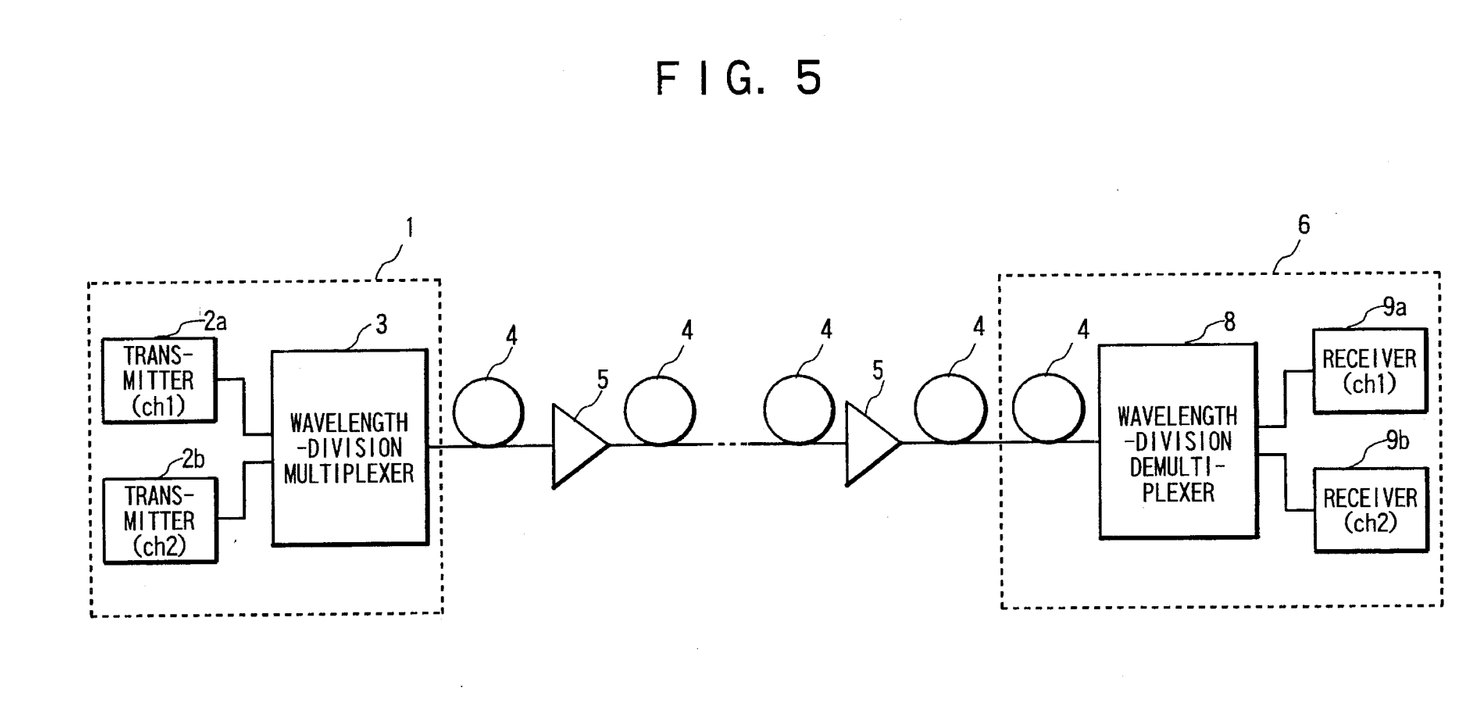
FIG. 5 is a block diagram of a construction example of the wavelength division multiplexed optical fiber transmission equipment which was used as an experimental example of the present invention.

The experimental example in which the present invention was embodied is now described. FIG. 5 is a block diagram showing an example of the wavelength division multiplexed optical fiber transmission equipment used in this experiment.

This experiment is constructed by using two channels, and the symbols in the figure represent the same symbols as those in FIG. 1 or the equivalents.

In this experimental example, the average zero-dispersion wavelength of the transmission optical fibers 4 and the maximum gain wavelength of the optical amplifiers 5 are set to 1558 nm. The zero-dispersion wavelengths of the respective dispersion shift optical fibers constituting the transmission optical fibers 4 are appropriately mixed so that there is no same one in contiguous sections, in other words, so that the accumulated chromatic dispersion for the whole transmission path becomes zero, though the accumulated chromatic dispersion is not zero for a section which is short as compared with the whole. The transmission optical fibers 4 for the all 16 sections are 1600 km, and the number of the optical amplifiers 5 used is 15. The signal wavelength of the channel 1 is set to 1553 nm, and the signal wavelength of the channel 2 is set to 1556 nm. The transmission speed B is 10 Gbps.

As the equalization optical fiber 7, an ordinary dispersion fiber having a length of 27 km was used. The chromatic dispersion of the equalization optical fiber 7 is about +490 ps/nm, which satisfies the condition of the expression (1). The residual chromatic dispersions in the channels 1 and 2 after the equalization are −80 ps/nm and +240 ps/nm, respectively, and thus they satisfy the expression (2).

Figure 6:
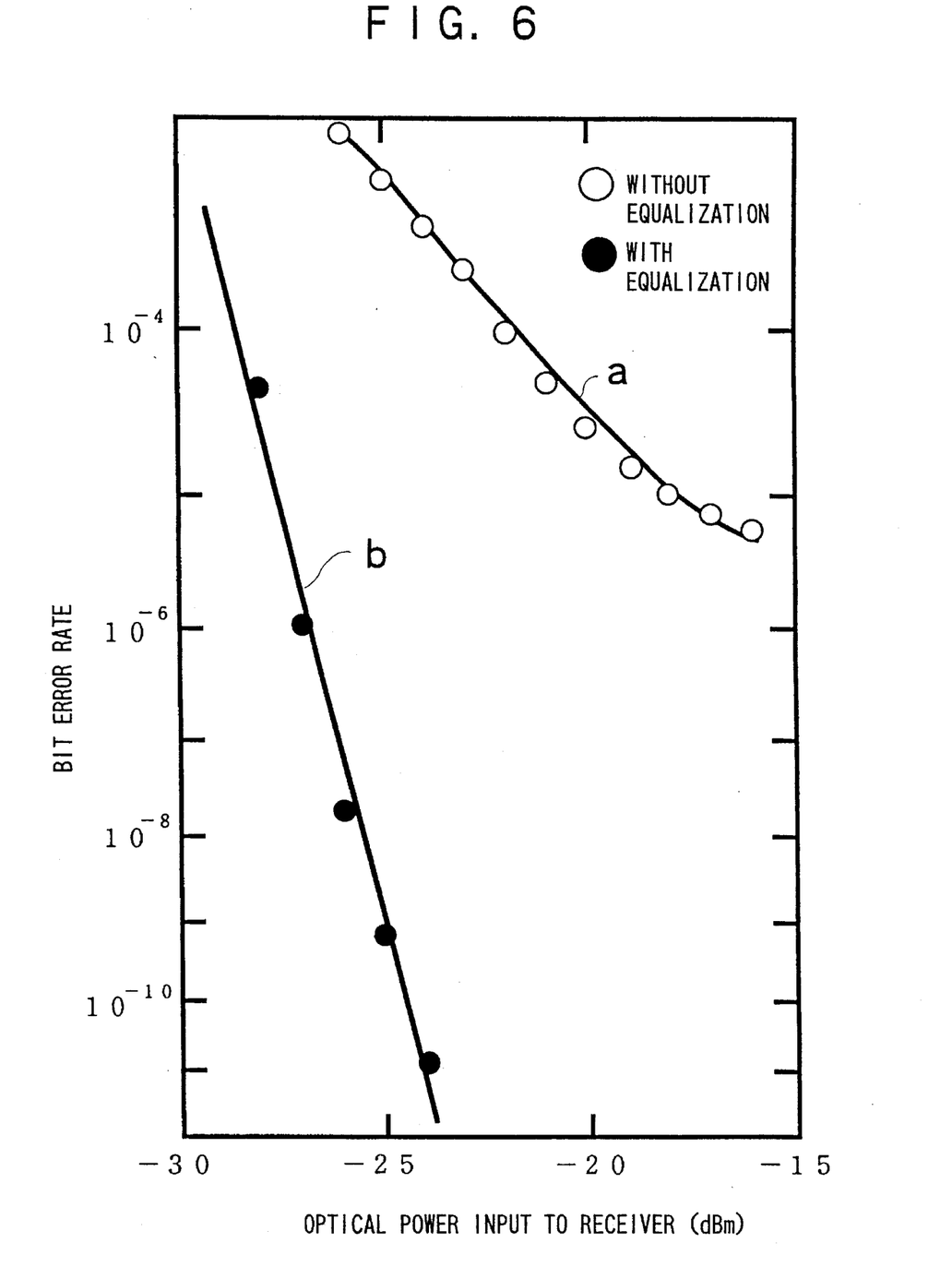
FIG. 6 is a graph showing a measurement example of the bit error rate characteristics of tile channel 1 of the experimental example of the present invention.

FIG. 6 shows the bit error rate characteristics after transmission of the channel 1 for the case in which the equalization optical fiber 7 exists in the receiving terminal 6, and for the case in which the equalization optical fiber 7 does not exist in the receiving terminal 6. If the equalization optical fiber 7 does not exist, the bit error rate is not lower than about $10^{-5}$ as shown by the curve in the same figure and the error rate of $10^{-9}$ which is the specified value of the transmission characteristics is not attained, but, if the equalization optical fiber 7 is inserted, the bit error rate of $10^{-9}$ or lower can be attained by its insertion effect as shown by the curve b.

Figure 7:
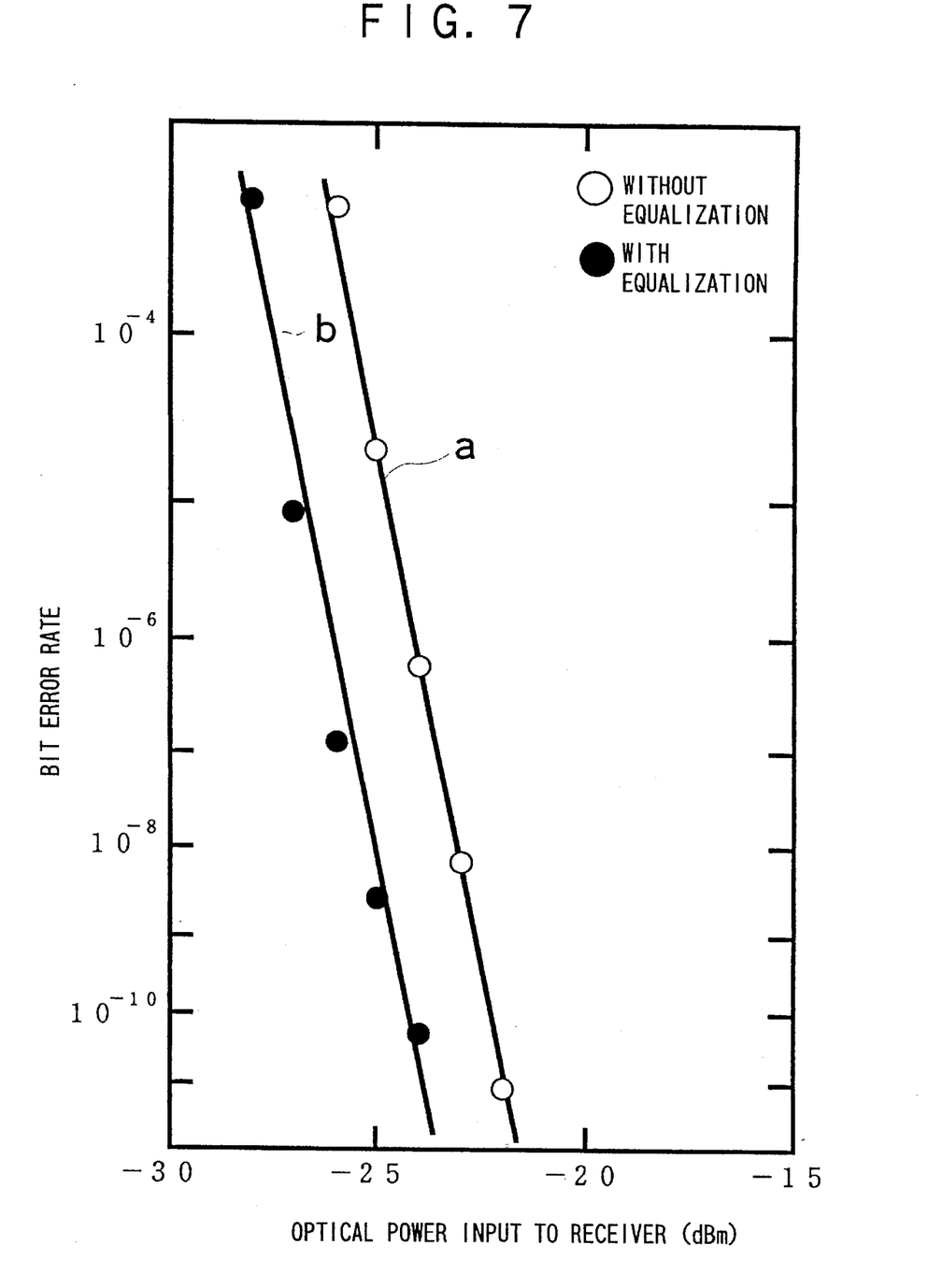
FIG. 7 is a graph showing the measurement example of the bit error rate characteristics of the channel 2 of the experimental example of the present invention.

FIG. 7 shows the bit error rate characteristics of the channel 2 for the case in which the equalization optical fiber 7 exists in the receiving terminal 6, and for the case in which the equalization optical fiber 7 does not exist in the receiving terminal 6. Although, in the channel 2, the error rate of $10^{-9}$ which is the specified value of the transmission characteristics is achieved even in the case in which the equalization optical fiber 7 does not exist, as shown by the curve a in the same figure, the insertion of the equalization optical fiber 7 further improves the characteristics by its insertion effect, as obvious from the curve b. The reason for this is that the effect of optical pulse compression is produced by the insertion of the equalization optical fiber 7 and the effect of the inter-symbol interference of the pulse is thereby suppressed.

Figure 8A:
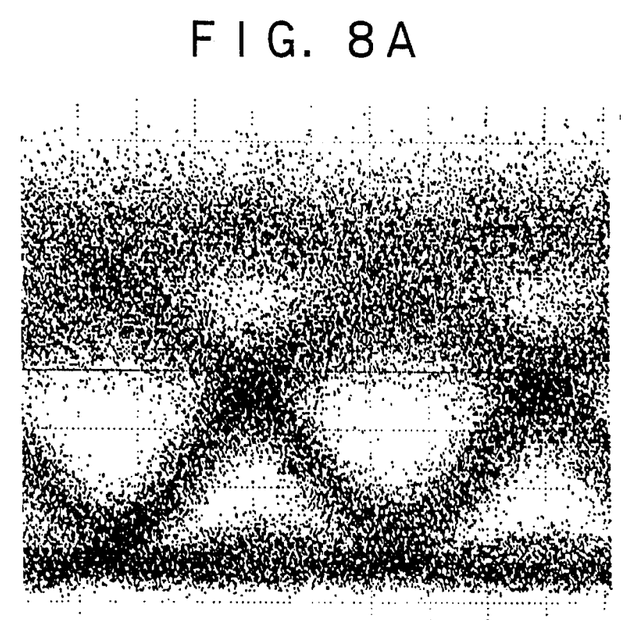
FIGS. 8A and 8B are figures showing the measurement examples of the optical eye when the equalization optical fiber of the channel 2 of the experimental example of the present invention does not exist, and of the optical eye when the equalization optical fiber exists, respectively.
Figure 8B:
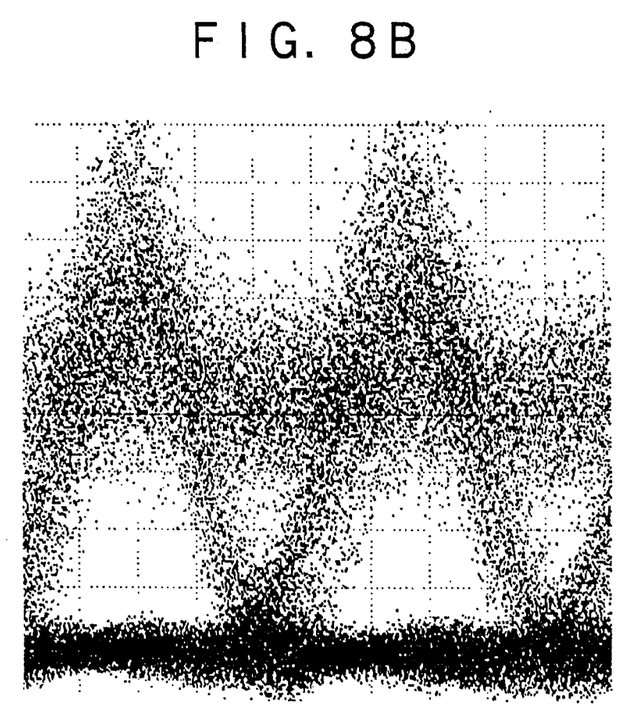

FIG. 8 shows the difference in the optical eyes between the case in which the equalization optical fiber 7 of the channel 2 exists or does not exist. If the equalization optical fiber is not inserted, the optical pulse expansion due to the effect of the chromatic dispersion occurs and the eye in the central portion becomes round, as shown in FIG. 8A, and thus an inter-symbol interference between the pulse occurs to degrade the transmission characteristics. However, if the equalization optical fiber 7 is inserted, the optical pulse is compressed into a sharp pulse by the insertion of the equalization optical fiber and the eye in the central portion is shaped in a trapezoid which largely opens, as shown in FIG. 8B, and thus the inter-symbol interference between the pulse is suppressed to improve the transmission characteristics.

Figure 9:
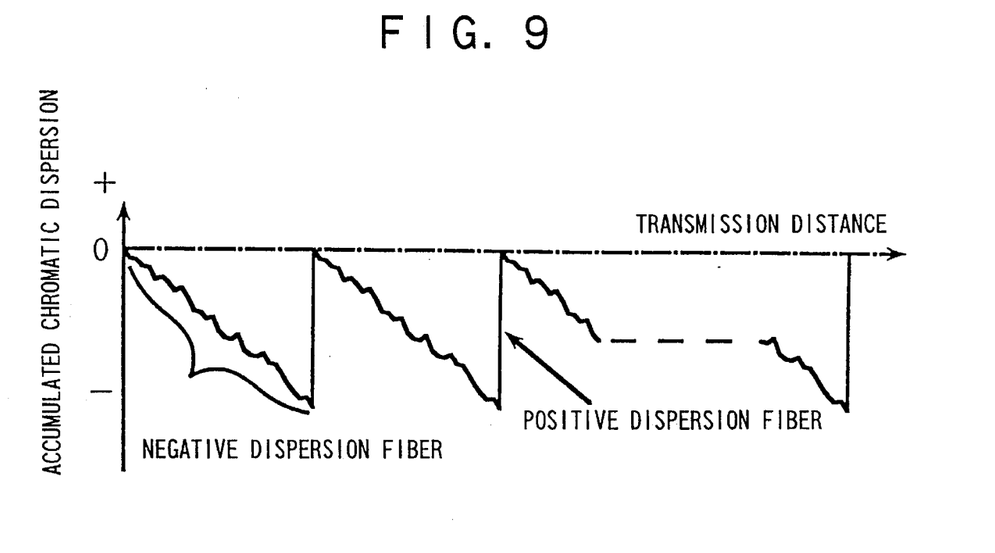
FIG. 9 is a diagram for explaining the change of the accumulated chromatic dispersion of the second embodiment relative to distance.

The second embodiment of the present invention is described below with reference to FIGS. 9 and 10. FIG. 9 shows the change of the accumulated chromatic dispersion by distance in the second embodiment. In the above described experiment, the optical fibers are disposed so that the average of the accumulated chromatic dispersions becomes zero, but, in this embodiment, the optical fibers are disposed so that the accumulated chromatic dispersions become negative in the most of the total transmission distance of the transmission path. In addition, the equalization optical fiber is comprised of a positive-dispersion optical fiber which is sufficiently short as compared with the total transmission distance, and it is disposed so that it equalizes the accumulated chromatic dispersions when the absolute values $D_{eq1}$ of the dispersion amounts to be equalized and the residual chromatic dispersions $D_{rem}$ after the equalization are accumulated to the extent that they do not exceed the limitations of the expressions (1) and (2).

Figure 10:
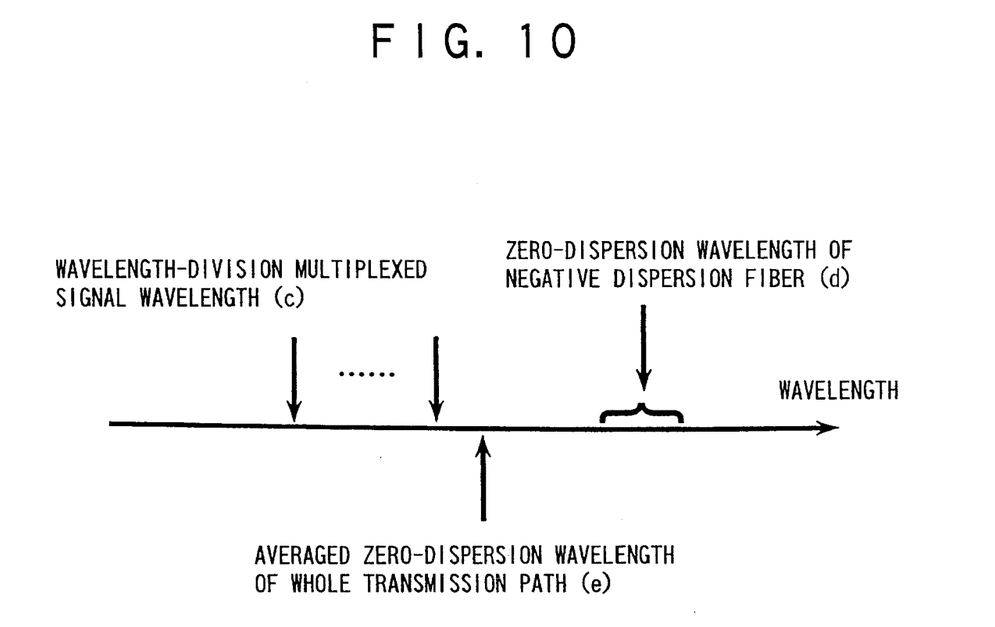
FIG. 10 is a diagram for explaining the relationship between the signal wavelength and the zero-dispersion wavelength in the second embodiment of the present invention.

FIG. 10 shows the relationship between the wavelength multiplexed signal wavelengths and the zero-dispersion wavelength of the optical fibers in this embodiment. As apparent from the figure, the signal wavelengths (c) and the zero-dispersion wavelengths (d) of the optical fibers are largely spaced apart from each other in the total transmission distance of the transmission path, and thus the occurrence of four-wave mixing is further suppressed thereby to improve the transmission characteristics.

In accordance with the present invention, a wavelength division multiplexed optical fiber transmission equipment having good transmission characteristics can be provided in which the distortion due to the four-wave mixing of wavelength multiplexed signals and the distortion due to the chromatic dispersion are optimized. Further, guidelines for designing a wavelength division optical fiber transmission equipment which are effective regardless of the system length can be provided.

Furthermore, since the transmission characteristics of the optical communication system using optical wavelength multiplexed signals are remarkably improved by the present invention, the effect of the present invention is very large in the construction of a wavelength division multiplexed optical fiber transmission equipment.

Moreover, in accordance with the present invention, the optical signal wavelengths of the wavelength multiplexed signals are all lying on the short-wavelength side or the long-wavelength side with respect to the average zero-dispersion wavelength of the whole transmission path, and thus it is possible that phase matching which is the requirement for the occurrence of a four-wave mixing is not satisfied, whereby an effect of reducing the occurrence of four-wave mixings is produced. In addition, since the waveform distortions of the respective signal wavelengths due to a long-distance transmission all have a similar trend, the waveform distortion due to the interaction between the wavelength dispersion and the nonlinearity of the transmission optical fibers is reduced by the dispersion equalization, and the optical signal transmission characteristics can thereby easily be improved.

Further, in accordance with the present invention, the signal wavelengths and the zero-dispersion wavelengths of the optical fibers can be largely spaced apart from each other, and thus the occurrence of four-wave mixings can substantially be suppressed thereby to greatly improve the transmission characteristics.

Furthermore, in accordance with the present invention, the chromatic dispersion due to the difference between the signal wavelength and the average zero-dispersion wavelength of the whole transmission path can be equalized in the transmission path by using an equalization optical fiber cable which is sufficiently short as compared with the total transmission distance.

Moreover, the equalization optical fiber cable may be disposed in the transmitting terminal or the receiving terminal, or in both of them, in which case there is an advantage that the installation and maintenance of the system become easy.

In addition, in accordance with the present invention, by designing an optical communication system for transmitting optic&l wavelength multiplexed signals so as to satisfy the expressions (1) and (2), a wavelength division multiplexed optical fiber transmission equipment having good transmission characteristics can be provided in which the distortion due to the four-wave mixing of wavelength multiplexed signals and the distortion due to the chromatic dispersion are optimized.

What is claimed is:

1. A wavelength division multiplexed optical fiber transmission equipment comprising:

a transmitter for transmitting a wavelength multiplexed optical signal, a receiver for receiving the wavelength multiplexed optical signal sent from said transmitter, optical fibers for interconnecting said transmitter and said receiver, an optical repeater inserted into said optical fibers for performing an optical amplification, and a dispersion medium inserted between said transmitter and said receiver for equalizing the chromatic dispersion distortion caused by the difference between the respective optical signal wavelengths of the wavelength multiplexed signal sent from said transmitter and the total average zero-dispersion wavelength of said optical fibers and said optical repeater, by means of a chromatic dispersion of the opposite sign, wherein the respective optical signal wavelengths output from said transmitter are all lying on one of the short-wavelength side and the long-wavelength side with respect to the total zero-dispersion wavelength of the optical transmission path comprising of said optical fibers, said repeater and said dispersion medium.

2. A wavelength division multiplexed optical fiber transmission equipment as set forth in claim i wherein the optical fibers are disposed so that an average of the accumulated chromatic dispersions becomes zero.

3. A wavelength division multiplexed optical fiber transmission equipment as set forth in claim 1 wherein the optical fibers are disposed so that the accumulated chromatic dispersions become negative in the most of the total transmission distance of the transmission path.

4. A wavelength division multiplexed optical fiber transmission equipment as set forth in claim 1 wherein the chromatic dispersions of said optical fibers are negative on said respective optical signal wavelengths.

5. A wavelength division multiplexed optical fiber transmission equipment as set forth in claim 1 wherein said dispersion medium consists of an equalization fiber sufficiently short as compared with the total transmission distance, said equalization fiber having a chromatic dispersion of the opposite sign for equalizing the chromatic dispersion caused by the difference between said respective optical signal wavelengths and the total average zero-dispersion wavelength of said optical fibers and said repeater.

6. A wavelength division multiplexed optical fiber transmission equipment as set forth in claim 5 wherein said equalization fiber is disposed in a transmitting terminal having said transmitter or said receiving terminal, or in both of them.

7. A wavelength division multiplexed optical fiber transmission equipment as set forth in claim 5 wherein said equalization fiber is inserted and disposed in the transmission path interconnecting said transmitting terminal having said transmitter and said receiving terminal.

8. A wavelength division multiplexed optical fiber transmission equipment as set forth in claim 1 wherein the absolute value $D_{eq1}$ (ps/nm) of the chromatic dispersion amount of said dispersion medium satisfies the following expression (1) as a function of the bit rate B (Gbps) of the transmission path at the all equalization points, and the residual chromatic dispersion $D_{rem}$ (ps/nm) after the equalization satisfies the following expression (2) at the all signal wavelengths; expression (1) is $0 < D_{eq1} \leq 50000/B^2$; expression (2) is $-30000/B^2 \leq D_{rem} \leq +30000/B^2$.

* * * * *

UNITED STATES PATENT AND TRADEMARK OFFICE
CERTIFICATE OF CORRECTION

PATENT NO. : 5,559,910
DATED : September 24, 1996
INVENTOR(S) : Taga et al.

Page 1 of 2

It is certified that error appears in the above-indentified patent and that said Letters Patent is hereby corrected as shown below:

Column 6, line 16, please delete the following $$"B^2L=\pi C/2\lambda^2D(2(\alpha^2+1)^{1/2}+2)"$$

and insert the following equation:

$$-- B^2L=\pi C/2\lambda^2D(2(\alpha^2+1)^{1/2}+2a)--$$

Column 6, line 30, please delete the following $$"DL \times 10^{-8} = \frac{1}{B^2 \times (10^9)^2} \frac{\pi C}{2\lambda^2(2\sqrt{a^2+1}+2a)}"$$

and insert the following equation:

$$--DL \times 10^{-3} = \frac{1}{B^2 \times (10^9)^2} \frac{\pi C}{2\lambda^2(2\sqrt{a^2+1}+2a)} --$$

UNITED STATES PATENT AND TRADEMARK OFFICE
CERTIFICATE OF CORRECTION

PATENT NO. : 5,559,910
DATED : September 24, 1996
INVENTOR(S) : Taga et al.

It is certified that error appears in the above-indentified patent and that said Letters Patent is hereby corrected as shown below:

Column 9, line 40, please delete "i" and insert ---1--.

Signed and Sealed this

Eleventh Day of February, 1997

Attest:

BRUCE LEHMAN

*Attesting Officer*  *Commissioner of Patents and Trademarks*